United States Patent
Koshigaya

(10) Patent No.: US 8,928,921 B2
(45) Date of Patent: Jan. 6, 2015

(54) PRINT SYSTEM, PRINT SERVER, CONTROL METHOD, AND STORAGE MEDIUM

(71) Applicant: Canon Kabushiki Kaisha, Tokyo (JP)

(72) Inventor: Motoki Koshigaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/886,027

(22) Filed: May 2, 2013

(65) Prior Publication Data

US 2013/0321860 A1    Dec. 5, 2013

(30) Foreign Application Priority Data

May 31, 2012  (JP) .................................. 2012-125116

(51) Int. Cl.
*G06F 3/12*   (2006.01)
*G06Q 10/10*  (2012.01)

(52) U.S. Cl.
CPC ............ *G06F 3/1292* (2013.01); *G06F 3/1212* (2013.01); *G06F 3/126* (2013.01); *G06Q 10/107* (2013.01)
USPC ......... 358/1.15; 358/1.13; 358/1.14; 370/229

(58) Field of Classification Search
None
See application file for complete search history.

(56) References Cited

U.S. PATENT DOCUMENTS

| 8,179,549 B1 * | 5/2012 | Evans ........................ 358/1.15 |
| 2004/0137919 A1 * | 7/2004 | Biundo ........................ 455/466 |
| 2007/0097400 A1 * | 5/2007 | Yasui et al. .................. 358/1.13 |
| 2008/0068646 A1 * | 3/2008 | Kobayashi ................... 358/1.15 |
| 2011/0055393 A1 * | 3/2011 | Akabane ...................... 709/225 |
| 2012/0147422 A1 * | 6/2012 | Honma ......................... 358/1.15 |
| 2013/0242336 A1 | 9/2013 | Koshigaya |

FOREIGN PATENT DOCUMENTS

| JP | 2001-312392 | 11/2001 |
| JP | 2004-220606 | 8/2004 |

* cited by examiner

*Primary Examiner* — Kimberly A Williams
*Assistant Examiner* — Richa Mishra
(74) *Attorney, Agent, or Firm* — Fitzpatrick, Cella, Harper & Scinto

(57) ABSTRACT

A print server receives an email, which has been transmitted from a mobile terminal device and in which a printer is designated as the print output destination for an attached file to the email, from a mail server, stores the received email in a storage unit, and executes print processing of print data for the attached file to the email. The print server manages the email and identification information about a reply mail in association with each other and transmits the reply mail to the mobile terminal device. The mobile terminal device provides a reprint instruction for the attached file by replying the email. The print server performs print processing of the attached file to an email managed in association with the identification information about the reply mail included in the replied email.

13 Claims, 14 Drawing Sheets

| No. | Extension | File type | Application name |
|---|---|---|---|
| 1 | pdf | pdf doc | pdf software |
| 2 | jpg | image | jpg software |
| 3 | htm, html | HTML doc | HTML software |
| 4 | txt | Text doc | Text editing software |

1045

| Printer driver | Printer name |
|---|---|
| LBP100 | 100 |
| LBP200 | 200 |
| LBP300 | 300 |
| ⋮ | ⋮ |
| LBP800 | 800 |
| LBP900 | 900 |

| No. | Extension | File type | Application name |
|---|---|---|---|
| 1 | pdf | pdf doc | pdf software |
| 2 | jpg | image | jpg software |
| 3 | htm, html | HTML doc | HTML software |
| 4 | txt | Text doc | Text editing software |

| Printer driver | Printer name |
|---|---|
| LBP100 | 100 |
| LBP200 | 200 |
| LBP300 | 300 |
| ⋮ | ⋮ |
| LBP800 | 800 |
| LBP900 | 900 |

FIG. 5C

| Reply mail identification information | Stored mail identification information |
|---|---|
| xxxxA.PS@mailprint.xx.jp | aaaaX.US@mailprint.xx.jp |
| yyyyB.PS@mailprint.xx.jp | bbbbY.US@mailprint.xx.jp |
| zzzzC.PS@mailprint.xx.jp | ccccZ.US@mailprint.xx.jp |
| ⋮ | ⋮ |

FIG. 7C
MAIL SERVER

STANDBY → IS MAIL RECEIVED? (S621)
- NO → (loop back)
- YES → STORE MAIL (S622) → IS POLLING MADE? (S623)
  - NO → (loop back)
  - YES → TRANSMIT MAIL TO PRINT SERVER (S624)

FIG. 7B
AP

STANDBY → IS WIRELESS SIGNAL RECEIVED? (S611)
- NO → (loop back)
- YES → TRANSFER SIGNAL TO WIRED LAN (S612)

FIG. 7A
MOBILE TERMINAL DEVICE

START → TRANSMIT MAIL (S601) → END

FIG. 8A
FIG. 8B
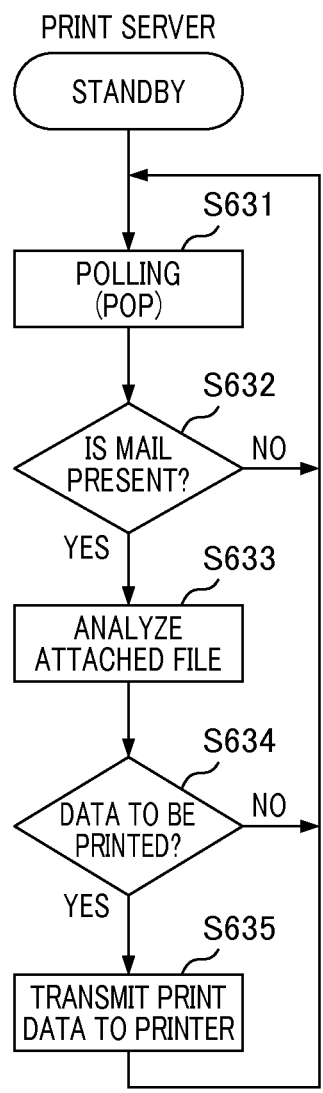
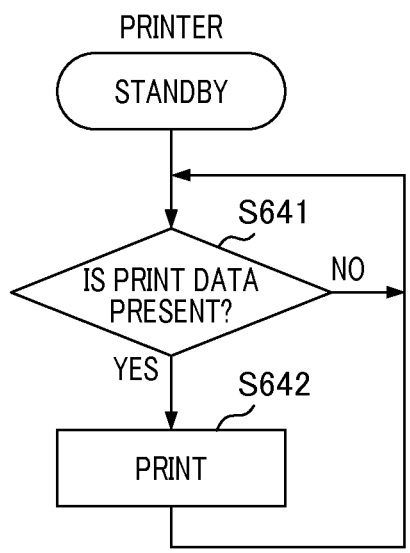

PRINT SYSTEM, PRINT SERVER, CONTROL METHOD, AND STORAGE MEDIUM

BACKGROUND OF THE INVENTION

1. Field of the Invention

The present invention relates to a print system, a print server, a control method, and a storage medium.

2. Description of the Related Art

There has been proposed a print system using mobile terminal devices. In the print system using mobile terminal devices, a mobile terminal device transmits an email attached with a file to an email address assigned for a printer. Then, the printer that has received the email prints the attached file to the email.

Japanese Patent Laid-Open No. 2004-220606 discloses a print system in which a mobile phone instructs a server to cause a printer to print-output an email message and an attached file to the email. Also, Japanese Patent Laid-Open No. 2001-312392 discloses a print system that realizes printout of a file attached to an email transmitted from a mobile terminal device using a dedicated adaptor provided between a server and a printer.

Here, a print system in which a server generates print data corresponding to an attached file to an email received from a user device and then transmits the print data to a printer serving as a print output destination is contemplated. In the print system (hereinafter referred to as "print system A"), a printer driver for each printer is installed on the server in advance. The server activates the print function in application software corresponding to an extension of an attached file to an email transmitted from the user device to thereby generate print data. Then, the server transmits the print data to the printer via a printer driver corresponding to the printer serving as the print output destination.

On the other hand, after printout of a desired document, a user may want to reprint the same document. In particular, when a user provides an instruction to print an attached file from a mobile terminal or a mobile phone, a sufficient preview may not be obtained depending on equipment capability, and thus, the user may want to reprint the document after viewing a print result.

However, when a user wants to reprint the same document in the print system A, the user needs to retransmit an email by attaching a file of the same document to the email. The email attached with the file has a large amount of data, resulting in an increase in time and communication cost for retransmission of the email.

SUMMARY OF THE INVENTION

The present invention provides a print system that print-outputs an attached file to an email transmitted from a user device via a server and realizes reprinting of the attached file that has already been print-output even when a user who wants to reprint the attached file does not retransmit an mail to which the attached file is attached again.

According to an aspect of the present invention, a print system is provided that includes an image forming device; and a print server that causes the image forming device to print-output an attached file to an email transmitted from a user device. The print server includes a reception unit configured to receive an email, which has been transmitted from the user device and in which an image forming device is designated as a print output destination for the attached file to the email, and store the received email in a first storage unit; a generation unit configured to generate print data corresponding to the attached file to the received email; a transmission unit configured to transmit the generated print data to the image forming device as the print output destination; a reply unit configured to transmit a reply mail indicating print completion to the user device when print data corresponding to the attached file to the email has been successfully printed in the image forming device, and a management unit configured to manage the email stored in the first storage unit and identification information about the reply mail in association with each other. Upon reception of an email including the identification information about the reply mail transmitted from the user device, the generation unit acquires an email managed in association with the identification information about the reply mail included in the received email from the first storage unit to thereby generate print data corresponding to the attached file to the acquired email.

Further features of the present invention will become apparent from the following description of exemplary embodiments with reference to the attached drawings.

BRIEF DESCRIPTION OF THE DRAWINGS

FIGS. 5A to 5C are diagrams illustrating examples of application information, driver information, and an identification information management list.

FIGS. 7A to 7C are diagrams illustrating an example of entire operation processing from transmission of an email to printing of an attached file to the email.

FIGS. 8A and 8B are diagrams illustrating an example of entire operation processing from transmission of an email to printing of an attached file to the email.

DESCRIPTION OF THE EMBODIMENTS

Figure 1:
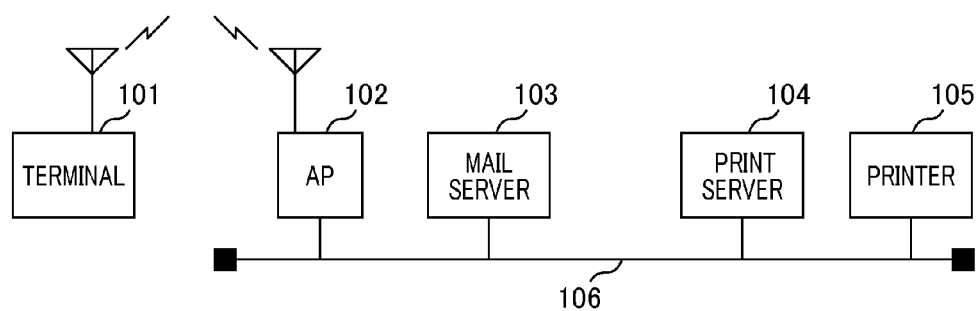
FIG. 1 is a diagram illustrating an exemplary system configuration of the present embodiment.

FIG. 1 is a diagram illustrating an exemplary system configuration of the present embodiment. The print system of the present embodiment includes a printer 105 and a print server 104. The printer 105 is an image forming device. The printer 105 print-outputs data received from the print server 104 in accordance with a print instruction given by the print server 104. A mobile terminal device 101 is a user device operated by a user. In this example, the mobile terminal device 101 is hand transportable. The mobile terminal device 101 mounts an operating system (hereinafter referred to as "OS") and can operate various application software programs on the OS. The mobile terminal device 101 transmits an email via wireless communication using E-mail software which is one of application software.

An access point (hereinafter referred to as "AP") 102 is a device which can provide communication between a device (e.g., the mobile terminal device 101) connected to a wireless communication network and a wired communication network (e.g., a wired LAN 106).

The print server 104 acquires an email transmitted from the mobile terminal device 101 to a mail server 103 from the mail server 103. The print server 104 causes the printer 105 to print-output an attached file to the acquired email. The print server 104 includes print driver software corresponding to a printer connected to the wired LAN (Local Area Network) 106.

The mail server 103 is an information processing device that receives an email and stores the email in a storage unit as well as passes the email stored in the storage unit to a print server in response to a request from the print server. The mail server 103 realizes its function by operating mail server software installed on the mail server 103. The wired LAN 106 connects the AP 102, the mail server 103, the print server 104, and the printer 105 with each other via an Ethernet (registered trademark) cable to thereby form a network structure. While, in the present embodiment, the printer 105 is directly connected to the wired LAN 106, a printer only having a local interface can be connected to the LIC 307 (shown in FIG. 2B) of the print server 104 via, for example, a USB cable. Even in such a configuration, the same function as that which can be realized by the configuration of the present embodiment can be realized only by changing the port setting of a printer driver to a USB port.

Figure 2A:
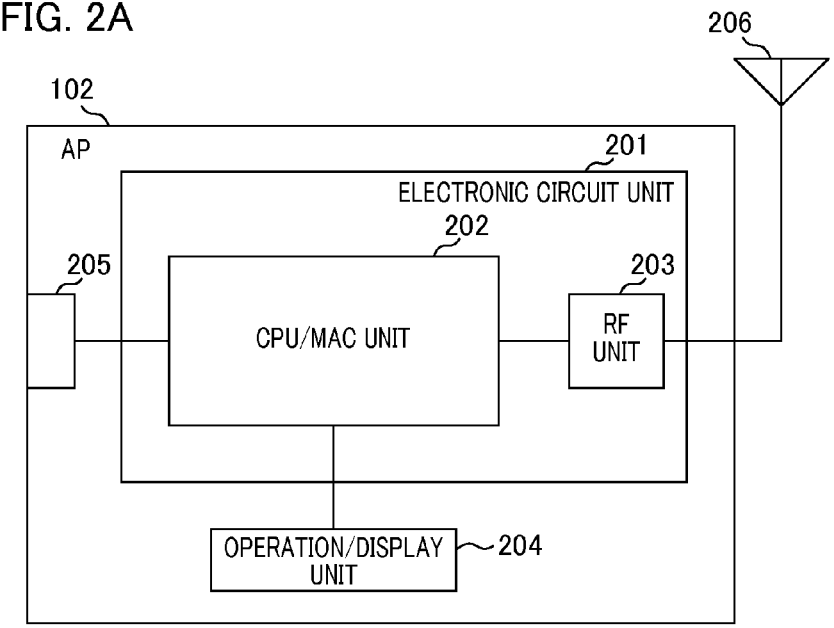
FIGS. 2A and 2B are diagrams illustrating an exemplary configuration of an AP and an exemplary hardware configuration of a print server.
Figure 2B:
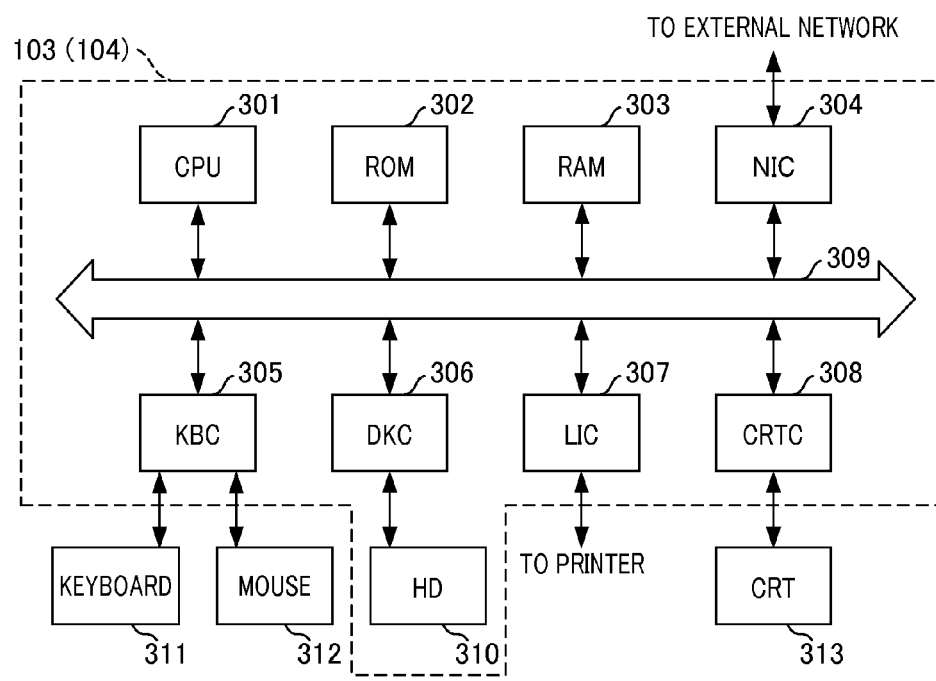

FIGS. 2A and 2B are diagrams illustrating an exemplary configuration of an AP and an exemplary hardware configuration of a print server. FIG. 2A is a diagram illustrating an exemplary configuration of the AP 102. The AP 102 includes an electronic circuit unit 201, an operation/display unit 204, and a wired LAN port 205.

The electronic circuit unit 201 controls the entire AP. The wired LAN port 205 is connected to the wired LAN 106 (shown in FIG. 1). For this purpose, the wired LAN port 205 has a connector which is connectable to an Ethernet (registered trademark) cable. The operation/display unit 204 executes status display of the AP 102 and status display of each port. The operation/display unit 204 includes, for example, an LED, a switch for simple connection to a wireless LAN, and the like. The AP 102 is also provided with a security function for appropriately establishing wireless LAN connection.

The electronic circuit unit 201 includes a CPU/MAC unit 202 and a radio frequency transmission/reception unit (hereinafter referred to as "RF unit") 203, where RF is an abbreviation for Radio Frequency. The CPU/MAC unit 202 includes a CPU and a MAC (Media Access Control) (none of which is shown). The CPU includes a device such as a processor, a memory, or the like. The devices are connected to each other via a bus (not shown). Also, the MAC has a processing unit for performing wireless communication and a processing unit for performing wired communication. The CPU/MAC unit 202 is connected to the operation/display unit 204, the RF unit 203, and the wired LAN port 205. An antenna 206 is attached to the RF unit 203. The antenna 206 transmits/receives electrical waves.

FIG. 2A shows the configuration of the AP 102 and the environment where the AP 102 is used. The AP 102 is connected to the wired LAN 106 shown in FIG. 1 via an Ethernet cable (not shown). The Ethernet cable is connected to the wired LAN port 205 at one end and is connected to a network hub (not shown) at the other end.

FIG. 2B is a diagram illustrating an exemplary hardware configuration of a print server. The print server 104 includes a CPU 301, a ROM 302, a RAM 303, and a network interface controller (NIC) 304. The print server 104 also includes a keyboard controller (KBC) 305, a disk controller (DKC) 306, a local interface controller (LIC) 307, and a CRT controller (CRTC) 308. The CPU 301, the ROM 302, the RAM 303, the network interface controller (NIC) 304, the keyboard controller (KBC) 305, the disk controller (DKC) 306, the local interface controller (LIC) 307, and the CRT 308 are connected to each other via a bus 309.

The CPU 301 controls the entire print server 104. The ROM 302 stores a basic I/O program, an operating system (OS), or the like. For example, the CPU 301 executes the OS to thereby manage and execute application programs. The RAM 303 is a storage unit having a work area for the CPU 301. The network interface controller (NIC) 304 is connected to the wired LAN 106 shown in FIG. 1 via the Ethernet cable.

A keyboard 311 and a mouse 312 are connected to the keyboard controller (KBC) 305. A hard disk (HD) 310 is connected to the disk controller (DKC) 306. Peripheral equipment is connected via a local interface such as a USB to the local interface controller (LIC) 307. A CRT display 313 is connected to the CRT controller (CRTC) 308.

The hard disk (HD) 310 stores a print application, various application programs, and a printer driver. Also, the HD 310 stores a program that realizes a mail client function and a printer control function. The CPU 301 realizes a mail attached file print function using the mail client function and the printer control function stored in the HD 310. The mail attached file print function is a function that causes the printer 105 to print-output an attached file to an email. Furthermore, the HD 310 stores application information, driver information, and an identification information management list (all of which will be described below).

The hardware configuration of the mail server 103 is the same as that of the print server 104 described with reference to FIG. 2B. Mail server software (an application for realizing an email transmission/reception function) is installed on the HD 310 provided in the mail server 103. The HD 310 provided in the mail server 103 also stores a program that realizes a function for generating an email and transmitting the email back to a sender in response to the content of the received email.

Figure 3:
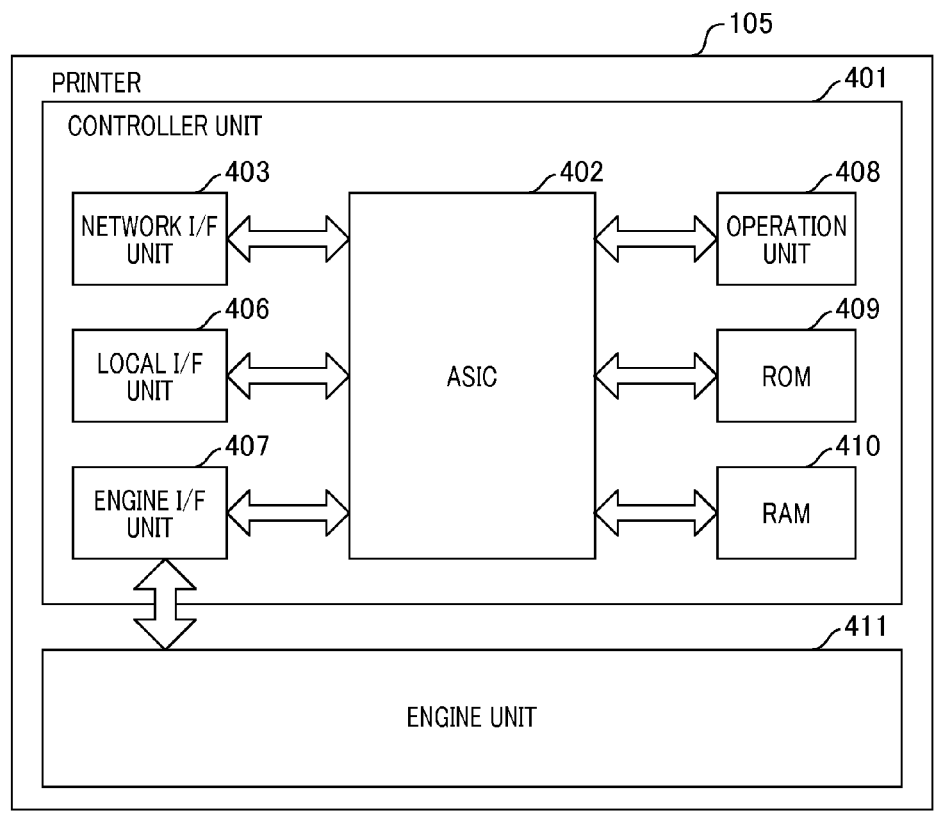
FIG. 3 is a diagram illustrating an exemplary hardware configuration of a printer.

FIG. 3 is a diagram illustrating an exemplary hardware configuration of a printer. The printer 105 includes a controller unit 401 and an engine unit 411. The controller unit 401 receives print data (in this example, PDL data) from the print server 104 and processes the received data.

The controller unit 401 includes an ASIC 402, a network I/F (Interface) unit 403, a local I/F unit 406, an engine I/F unit 407, an operation unit 408, a ROM 409, and a RAM 410, where ASIC is an abbreviation for Application Specific Integrated Circuit, ROM is an abbreviation for Read Only Memory, and RAM is an abbreviation for Random Access Memory.

The ASIC 402 incorporates a CPU and mainly executes processing for passing the received data to the engine unit 411. For this purpose, the ASIC 402 executes a control program stored in the ROM 409. The ASIC 402 receives print data (PDL data) from the print server 104 via, for example, the network I/F unit 403. The ASIC 402 develops the received print data and executes rendering processing to thereby generate a bitmap image. The ASIC 402 stores the generated bitmap image in an image spool area of the RAM 410. The engine I/F unit 407 transfers the bitmap image stored in the image spool area of the RAM 410 to the engine unit 411 in synchronization with the engine unit 411. The engine unit 411 print-outputs the bitmap image received from the ASIC 402 via the engine I/F unit 407.

The network I/F unit 403 and the local interface unit 406 execute transmission/reception processing for transmitting/receiving data to/from an external device (e.g., the print server 104) via Ethernet (registered trademark) or an external interface such as an USB. The operation unit 408 passes the status of a printer to a user and executes input processing in response to the operation by the user.

The ROM 409 stores a control program executed by the ASIC 402 in advance. The RAM 410 functions as an image expansion area or a work area for the control program when the ASIC 402 processes an attached file.

Figure 4:
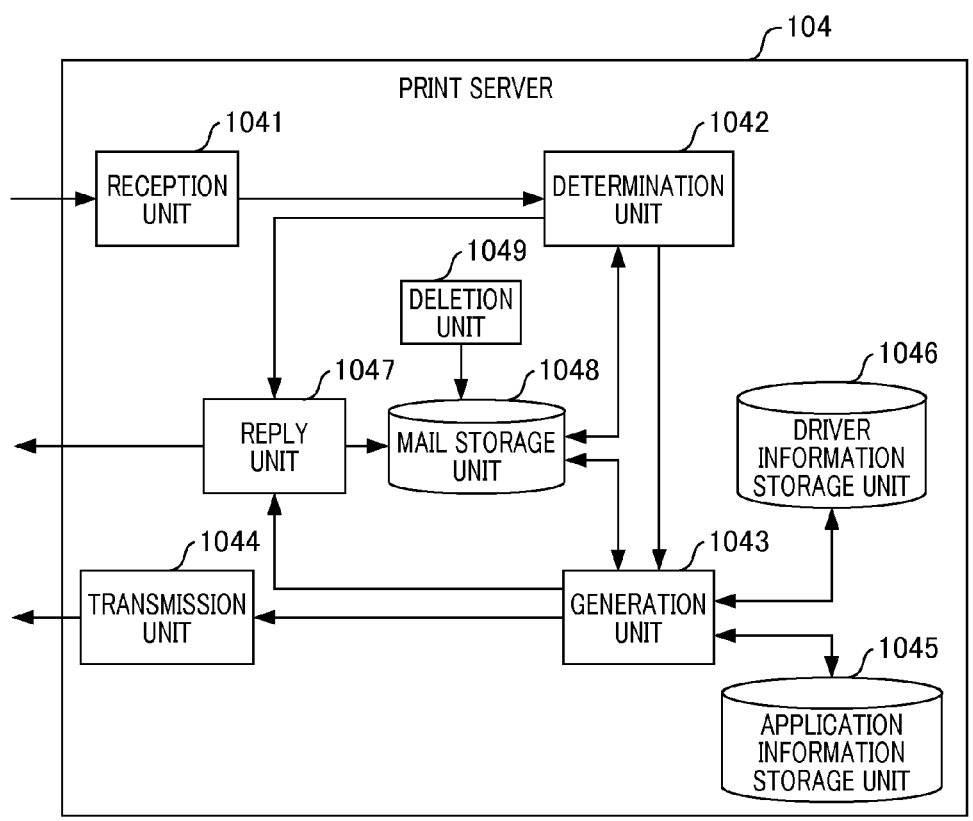
FIG. 4 is an exemplary functional block diagram illustrating a print server.

FIG. 4 is an exemplary functional block diagram illustrating a print server. The print server 104 includes a reception unit 1041, a determination unit 1042, a generation unit 1043, a transmission unit 1044, an application information storage unit 1045, a driver information storage unit 1046, and a reply unit 1047. The print server 104 also includes a mail storage unit 1048 and a deletion unit 1049. A method for controlling the print server of the present embodiment is realized by the functions of processing units shown in FIG. 4. The computer program of the present embodiment causes a computer to execute the method for controlling a print server.

The reception unit 1041 receives (acquires) an email transmitted from the mobile terminal device 101 from the mail server 103. The printer 105 serving as the print output destination of an attached file to the email is designated in the email. A printer is designated by describing a character string indicating a printer name in, for example, the subject field of an email. A printer may also be designated by describing a character string indicating a printer name in the text field of an email. The reception unit 1041 stores the received email in the mail storage unit 1048 serving as the first storage unit in association with identification information about the email.

The determination unit 1042 executes the following determination processing (first determination processing) based on driver information stored in the driver information storage unit 1046. The determination unit 1042 determines whether or not the driver information includes a printer driver which corresponds to the printer 105 designated as the print output destination in the email received by the reception unit 1041.

When it is determined in the first determination processing that the driver information includes a printer driver which corresponds to the printer 105 designated as the print output destination, the determination unit 1042 executes the following second determination processing. The determination unit 1042 determines whether or not the application information stored in the application information storage unit 1045 includes an application corresponding to the file extension of an attached file to an email.

When it is determined in the second determination processing that the application information includes an application corresponding to the file extension of an attached file to an email, the generation unit 1043 generates print data corresponding to an attached file to an email. The transmission unit 1044 transmits the print data generated by the generation unit 1043 to the printer 105 as the print output destination.

When print output processing for print data corresponding to an attached file to an email is successfully performed by the printer 105, the reply unit 1047 executes the following processing. The reply unit 1047 stores the correspondence information between the email and identification information about a reply mail in the mail storage unit 1048. More specifically, the reply unit 1047 stores the correspondence information between identification information about an email to which an attached file has been successfully printed and identification information about a reply mail in the mail storage unit 1048 as an identification information management list. In this manner, the reply unit 1047 manages the email stored in the mail storage unit 1048 and the identification information about the reply mail in association with each other. Then, the reply unit 1047 transmits the reply mail to the mobile terminal device 101.

A user of the mobile terminal device 101 which has received the reply mail can provide a reprint instruction for reprinting an attached file to the email by sending a reply to the reply mail (transmitting an email). When a reprint instruction is provided, identification information about a reply mail replied from the reply unit 1047 to the mobile terminal device 101 is included in an email to be replied from the mobile terminal device 101. The generation unit 1043 acquires an email, about which identification information is managed in association with identification information about a reply mail included in the email replied from the mobile terminal device 101, from the mail storage unit 1048. The generation unit 1043 generates print data corresponding to an attached file to the acquired email. The generated print data is transmitted to the printer 105 via the transmission unit 1044.

The application information storage unit 1045 functions as a second storage unit. The application information storage unit 1045 stores application information in advance. The application information includes correspondence information between a file extension and an application for opening a file corresponding to the file extension.

The driver information storage unit 1046 functions as a third storage unit. The driver information storage unit 1046 stores driver information in advance. The driver information is information about a printer driver corresponding to the printer. The deletion unit 1049 deletes an email after a predetermined time has elapsed after storage of the email from among emails stored in the mail storage unit 1048. In practice, the HD 310 serving as the hardware resource functions as the mail storage unit 1048, the application information storage unit 1045, and the driver information storage unit 1046.

FIGS. 5A to 5C are diagrams illustrating examples of application information, driver information, and an identification information management list. FIG. 5A shows an example of application information. The application information includes data items such as extension, file type, and application name. Extension indicates the extension of a file. File type indicates the type of a file. Application name indicates the name of an application corresponding to the file. An application corresponding to a file is an application which is capable of opening the file.

FIG. 5B shows an example of driver information. The driver information includes data items such as printer driver and printer name. Printer driver indicates a printer driver corresponding to a printer registered in the print server 104. Printer name indicates the name of a printer registered in the print server 104. When a new printer is connected to the wired LAN 106 shown in FIG. 1 or when a new printer is connected to the local interface of the print server 104, the CPU 301 in the print server 104 adds information of the printer driver and printer name to driver information.

FIG. 5C shows an exemplary identification information management list. Reply mail identification information and stored mail identification information are set on the identification information management list by associating reply mail identification information and stored mail identification information with each other. The reply mail identification information is identification information about a reply mail replied from the print server 104 to the mobile terminal device 101 as the transmission source of an email after completion of print processing of an attached file to the email. The stored mail identification information is identification information about an email attached with a file whose print processing is completed from among emails stored in the mail storage unit 1048.

Figure 6:
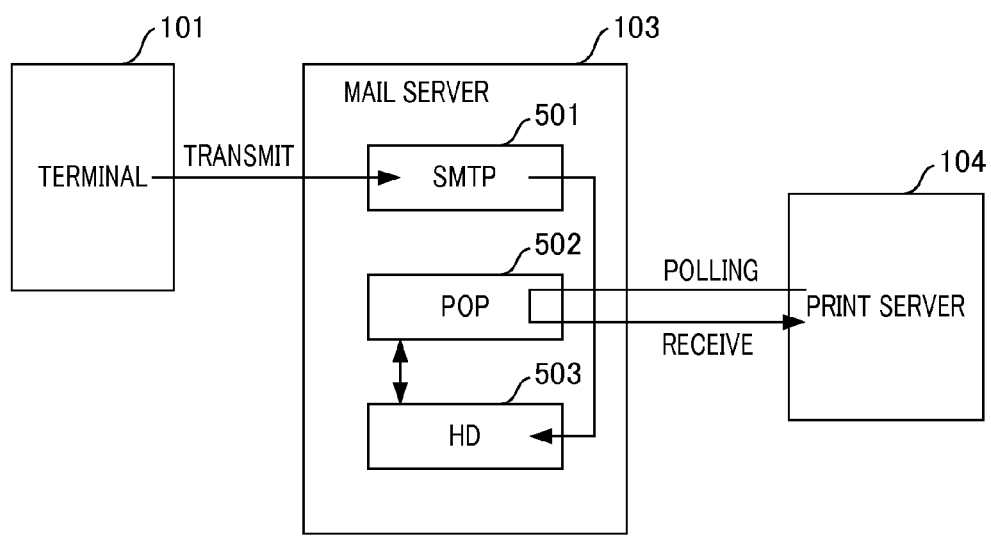
FIG. 6 is a diagram illustrating an example of transmission/reception processing of an email via a mail server.

FIG. 6 is a diagram illustrating an example of transmission/reception processing of an email via a mail server. The mail server includes an SMTP server 501, a POP server 502, and an HD (Hard Disk) 503, where SMTP is an abbreviation for Simple Mail Transfer Protocol and POP is an abbreviation for Post Office Protocol.

Firstly, a description will be given of processing performed when the mail server 103 receives an email from the mobile terminal device 101. The mobile terminal device 101 transmits an email using E-mail software installed therein. The transmitted email is received by the SMTP server 501 connected to the wired LAN via the AP 102 (not shown). The E-mail software installed on the mobile terminal device 101 designates the mail address (destination) of a predetermined mail server 103. The E-mail software designates the following mail address:

USER@mailprint.xx.jp

The SMTP server 501 stores the received email in the hard disk 503 and ends the operation. When a user wants to reject a reply mail to an email from the print server 104 which has executed print control processing for an attached file to the email transmitted from the mobile terminal device 101, the user executes the following processing. A user sets a reply rejection attribute indicating rejection of a reply mail to an email to be transmitted using a predetermined UI. In this manner, a reply mail rejection setting is made to an email.

Next, a description will be given of the operation of receiving an email from the mail server 103 to the print server 104. The reception unit 1041 of the print server 104 confirms the presence/absence of email reception (polling reception) to the POP server 502 within the mail server 103. At this time, the print server 104 designates a predetermined mail address (destination). An optionally set interval may be used as a polling interval.

Upon reception of access by polling from the print server 104, the POP server 502 requests a user name and a password to the print server 104. When the POP server 502 confirms that the user name and the password received from the print server 104 are correct, the POP server 502 examines a received mail stored in the HD 503 and then replies the presence/absence of an email addressed to the print server 104. When there is an email addressed to the print server 104 in the POP server 502, the POP server 502 delivers the email to the print server 104 and ends the operation.

FIG. 7 and FIG. 8 are diagrams illustrating an example of entire operation processing from transmission of an email to printing of an attached file to the email. FIG. 7A is a flowchart illustrating an operation performed by a mobile terminal device. The steps shown in FIG. 7A are processed by executing a program stored in a memory by a CPU of a mobile terminal device. E-mail software installed on the mobile terminal device 101 attaches a file to be printed and desired by a user to an email in response to a user operation, and then transmits the email via a wireless LAN (step S601). Note that the mobile terminal device 101 may transmit an email via any communication unit (e.g., 3G line) to external equipment instead of a wireless LAN.

Figure 9:
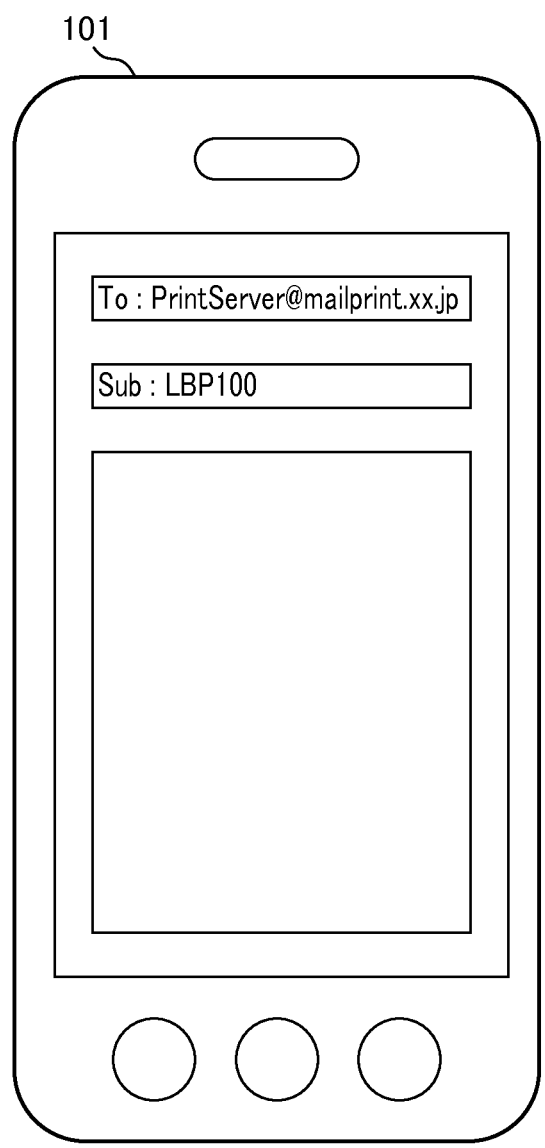
FIG. 9 is a diagram illustrating an exemplary operation screen to be displayed on a mobile terminal device.

FIG. 9 shows an exemplary operation screen to be displayed on a mobile terminal device upon transmission of an email. A user enters the destination of an email in the destination field. In this example, a user enters USER@mailprint.xx.jp in the destination field. A user also enters the printer name of a printer desired to perform printing in the subject field. In this example, a user enters LBP100 in the subject field. In accordance with an entry of a printer name in the subject field, E-mail software designates a printer with the entered printer name as a printer serving as a print output destination.

A user may enter the printer name of a printer serving as a print output destination in the text of an email and then E-mail software may designate a printer with the printer name entered in the text as a printer serving as a print output destination. In other words, E-mail software functions as a designation unit that designates a printer serving as a print output destination for an attached file by setting identification information about the printer serving as the print output destination for the attached file to an email to a subject field or a text field of the email to be transmitted. A user may also designate a printer serving as a print output destination by including any printer identification attribute such as a printer IP address, a printer location, a printer administrator, or the like instead of a printer name in an email.

FIG. 7B is a flowchart illustrating an operation performed by an AP. The AP 102 determines whether or not an email transmitted from the mobile terminal device 101 has been received as a wireless signal via the wireless LAN and the antenna 206 (step S611). When no wireless signal has been received, the process returns to step S611. When a wireless signal has been received, the RF unit 203 converts the wireless signal from an analog signal to a digital signal.

Next, the CPU/MAC unit 202 analyzes the destination and the path from the converted digital signal. The CPU/MAC unit 202 transmits the email converted into a digital signal to the mail server 103 (the SMTP server 501 shown in FIG. 6) via the wired LAN port 205 and the wired LAN 106 (step S612). Then, the process returns to step S611.

FIG. 7C is a flowchart illustrating an operation performed by a mail server. The steps shown in FIG. 7C are processed by reading out the program stored in a memory such as the ROM 302, the HD 310, or the like to the RAM 303 and executing the read program by the CPU 301. It is determined whether or not the SMTP server 501 of the mail server 103 has received an email (step S621). When it is determined that the SMTP server 501 has not received an email, the process advances to step S623. When it is determined that the SMTP server 501 has received an email, the SMTP server 501 stores the email in the HD 503 together with an attached file (step S622).

Next, the POP server 502 determines whether or not mail confirmation (polling) has been performed from the print server 104 (step S623). When no polling has been performed from the print server 104, the process returns to step S621. When polling has been performed from the print server 104, the POP server 502 acquires an email corresponding to the print server 104 and an attached file from the HD 503, and transmits the email and the attached file to the print server 104 (step S624). Then, the process returns to step S621.

FIG. 8A is a flowchart illustrating an operation performed by a print server. The steps shown in FIG. 8A are processed by reading out the program stored in a memory such as the ROM 302, the HD 310, or the like to the RAM 303 and executing the read program by the CPU 301. The reception unit 1041 of the print server 104 polls the POP server 502 (step S631). The reception unit 1041 determines whether or not to have received an email from the POP server 502 (step S632). When the reception unit 1041 determines not to have received an email from the POP server 502, the process returns to step S631. When the reception unit 1041 determines to have received an email from the POP server 502, the determination unit 1042 analyzes an attached file to the email (step S633).

Next, the determination unit 1042 determines whether or not the attached file is data to be printed based on the result of analysis in step S633 (step S634). When the determination unit 1042 determines that the attached file is not data to be printed, the process returns to step S631.

When the determination unit 1042 determines that the attached file is data to be printed, the process advances to step S635. The transmission unit 1044 transmits the attached file or print data (PDL data) corresponding to the attached file to the printer 105 serving as the print output destination (step S635). Then, the process returns to step S631. Print data corresponding to the attached file is generated by converting the attached file into PDL data by an application activated by the generation unit 1043.

A detailed description will be given below of the processes in steps S631 to S635 described above with reference to FIG. 10 and FIG. 11. In the present embodiment, data to be treated by the print server 104 prior to conversion of an attached file into PDL data, i.e., data for use in various applications is described as an "attached file", and data (PDL data) converted (developed) by an application is described as "print data".

FIG. 8B is a flowchart illustrating an operation performed by a printer. The steps shown in FIG. 8B are processed by reading out the program stored in a memory such as the ROM 409 or the like to the RAM 410 and executing the read program by the ASIC 402. The printer 105 determines whether or not to have received print data from the print server 104 (step S641). When the printer 105 determines not to have received an attached file or print data from the print server 104, the process returns to step S641. When the printer 105 determines to have received print data from the print server 104, the process advances to step S642. Then, the printer 105 print-outputs the received print data (step S642), and the process returns to step S641.

Figure 10:
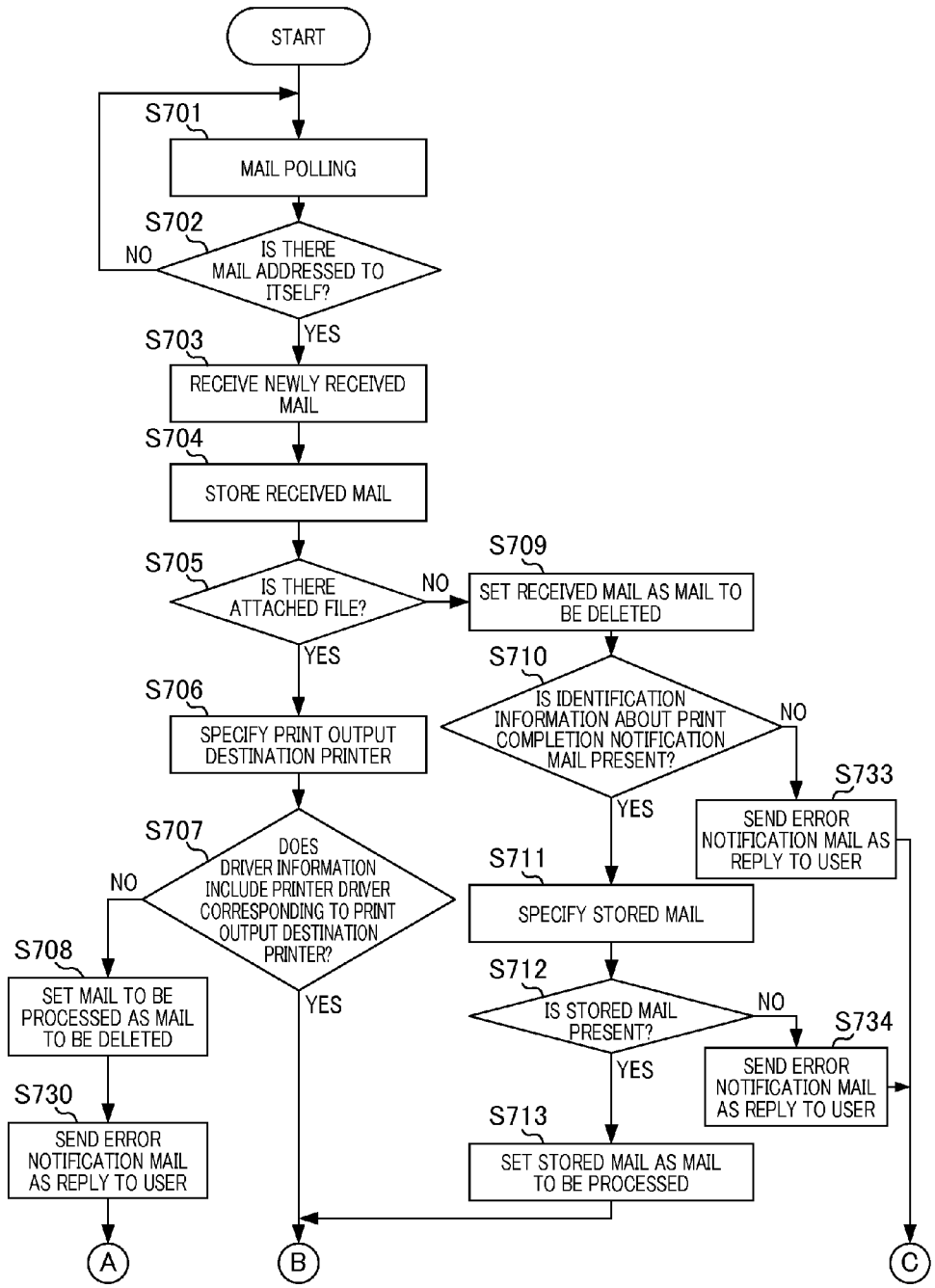
FIG. 10 is a diagram illustrating the detail of operation processing performed by a print server.
Figure 11:
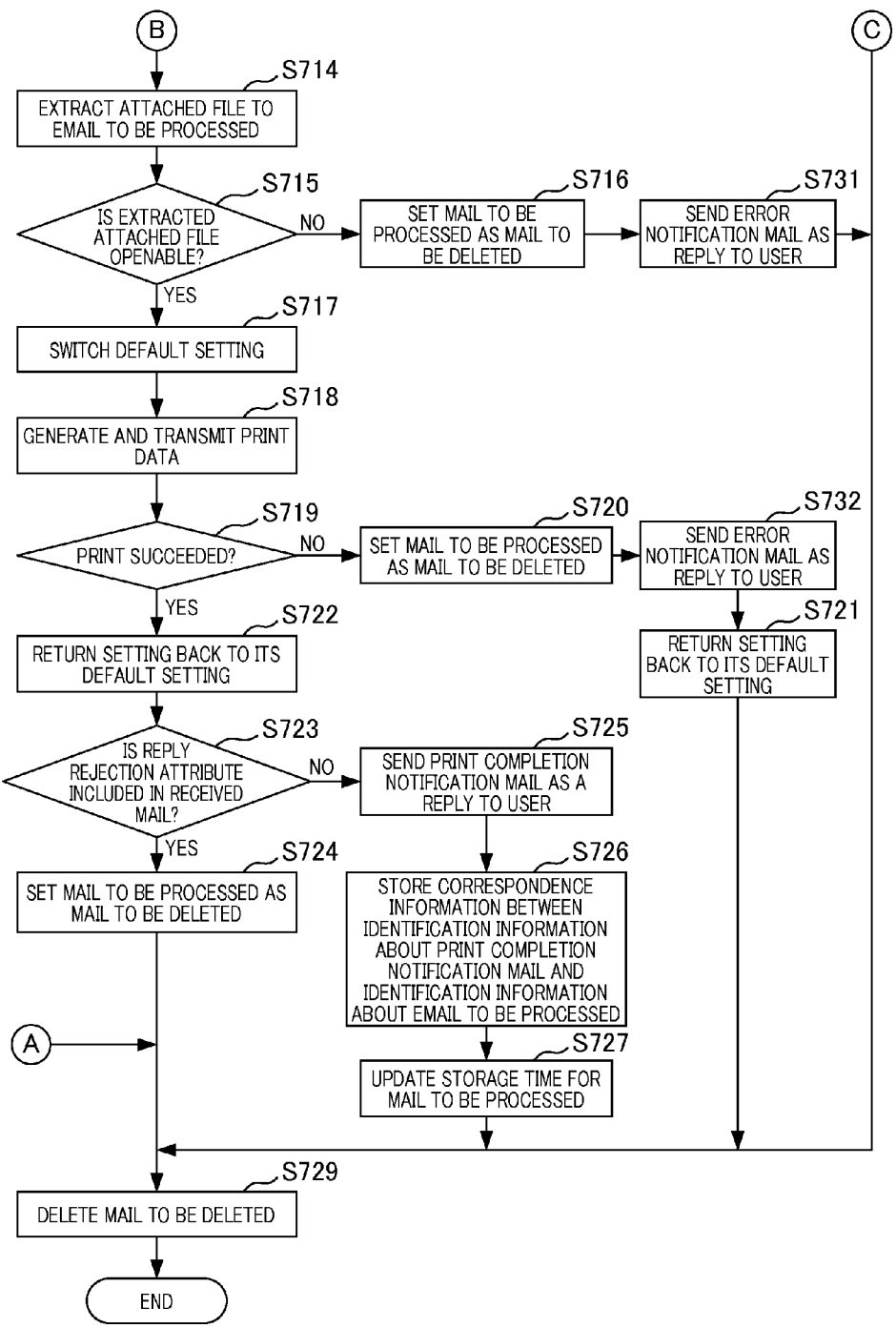
FIG. 11 is a diagram illustrating the detail of operation processing performed by a print server.

FIG. 10 and FIG. 11 are diagrams illustrating the detail of operation processing performed by a print server. The processes in steps shown in FIGS. 10 and 11 are processed by reading out the program stored in a memory such as the ROM 302, the HD 310, or the like to the RAM 303 and executing the read program by the CPU 301. The CPU 301 controls the connected modules or the embedded modules in response to execution content. The operation processing shown in FIG. 10 and FIG. 11 corresponds to processing described with reference to FIG. 8A.

Firstly, in step S701 shown in FIG. 10, the reception unit 1041 of the print server 104 polls an email (step S701). Then, the reception unit 1041 determines whether or not there is an email addressed to the print server 104 (step S702). When there is no email addressed to the print server 104, the process returns to step S701, and polling is made for each predetermined period of time. When there is an email addressed to the print server 104, the reception unit 1041 receives the email from the mail server 103 (step S703). The reception unit 1041 stores the received email in the mail storage unit 1048 (step S704).

Next, the determination unit 1042 executes the following processing by setting the received email as a mail to be processed. The determination unit 1042 determines whether or not there is an attached file to the email to be processed (step S705). When there is no file attached to the email, the process advances to step S709. When there is an attached file to the email, the determination unit 1042 acquires a printer name filled in the subject field of an email, and specifies a printer corresponding to the printer name as a printer (print output destination printer) designated as a print output destination (step S706).

Next, the determination unit 1042 determines whether or not the driver information includes a printer driver corresponding to the print output destination printer with reference to the driver information (shown in FIG. 5B) stored in the driver information storage unit 1046 (step S707). When the driver information includes a printer driver corresponding to the print output destination printer, the determination unit 1042 specifies the printer driver, and the process advances to step S714 shown in FIG. 11.

When the driver information does not include a printer driver corresponding to the print output destination printer, the determination unit 1042 sets an email to be processed as an email to be deleted (step S708), and the process advances to step S730. In step S708, the determination unit 1042 sets a flag (deletion flag) for setting an email to be processed to an email to be deleted.

Next, the reply unit 1047 sends an error notification mail as a reply to the mobile terminal device 101 which is the transmission source of an email to be processed (step S730). Then, the process advances to step S729 shown in FIG. 11, the deletion unit 1049 deletes an email in which a deletion flag is set from among emails stored in the mail storage unit 1048, and ends processing.

Figure 12A:
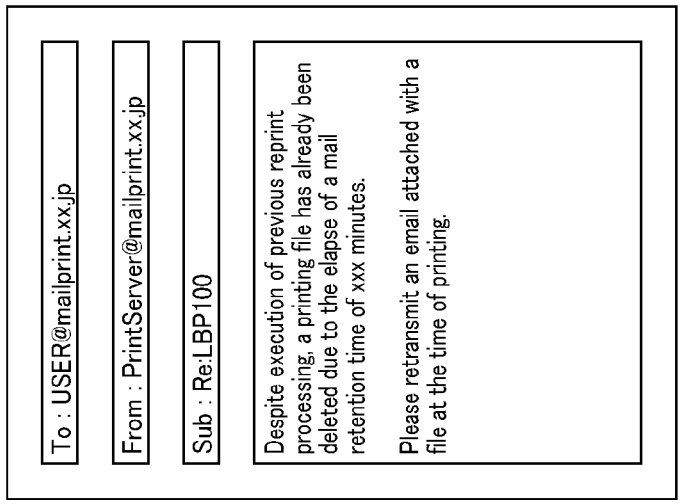
FIGS. 12A to 12F are diagrams illustrating examples of error notification mails and print completion notification mails.

FIG. 12A shows an exemplary display screen on which an error notification mail sent as a reply in step S730 is displayed. Since it is determined in determination processing in step S708 shown in FIG. 10 that a printer driver corresponding to the print output destination printer is not set in the driver information, it is contemplated that a user has incorrectly input a printer name or has forgotten to input a printer name. It is also contemplated that a user may not know a printer which can be designated for printout. Thus, as shown in FIG. 12A, the reply unit 1047 sends as a reply an error notification mail including an indication of a wrong printer instruction and a list of printer drivers corresponding to printers which can be designated for printout, i.e., a list of printer drivers included in the driver information.

In step S714 shown in FIG. 11, the determination unit 1042 extracts an attached file to an email to be processed from the mail storage unit 1048 (step S714). Then, the determination unit 1042 determines whether or not the extracted attached file can be opened by an application installed on the print server 104 (step S715). More specifically, the determination unit 1042 determines whether or not application information (shown in FIG. 5A) includes an application name corresponding to the extension of the extracted attached file.

When the application information includes an application name corresponding to the extension of the extracted attached file, the determination unit 1042 determines that the extracted attached file can be opened by an application installed on the print server 104. The determination unit 1042 specifies an application having the application name as an application for use in development of an attached file. Then, the process advances to step S717. When the application information does not include an application name corresponding to the extension of the extracted attached file, the determination unit 1042 determines that the extracted attached file cannot be opened by an application installed on the print server 104. Then, the process advances to step S716.

In step S716, the determination unit 1042 sets a deletion flag to an email to be processed. Then, the reply unit 1047 sends an error notification mail as a reply to the mobile terminal device 101 which is the transmission source of an email to be processed (step S731), and the process advances to step S729.

Figure 12B:
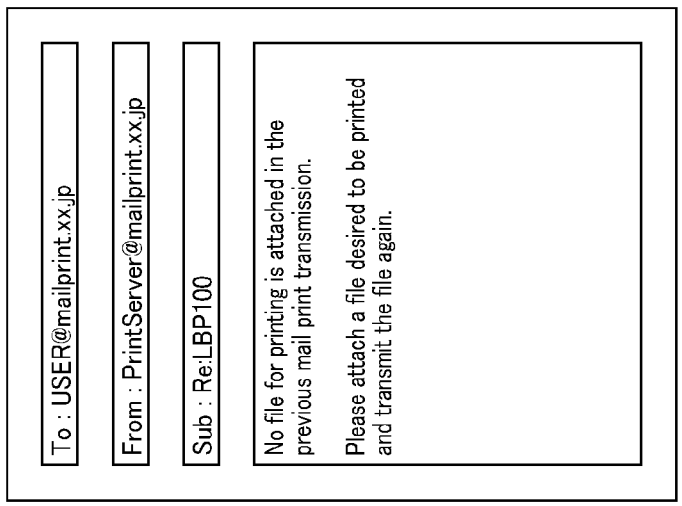
Figure 12C:
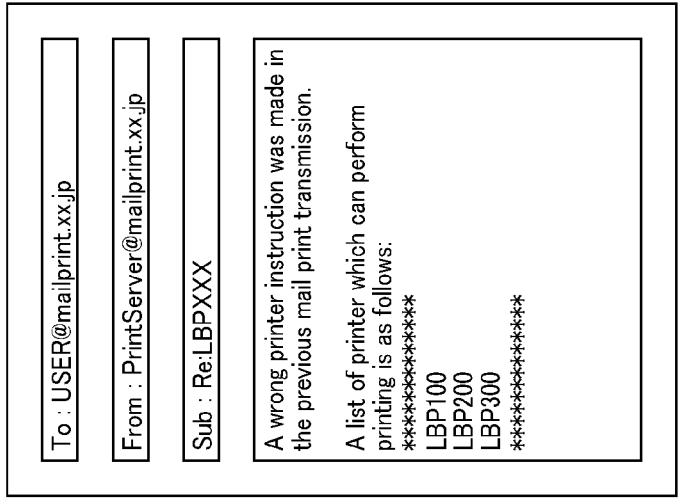
Figure 12D:
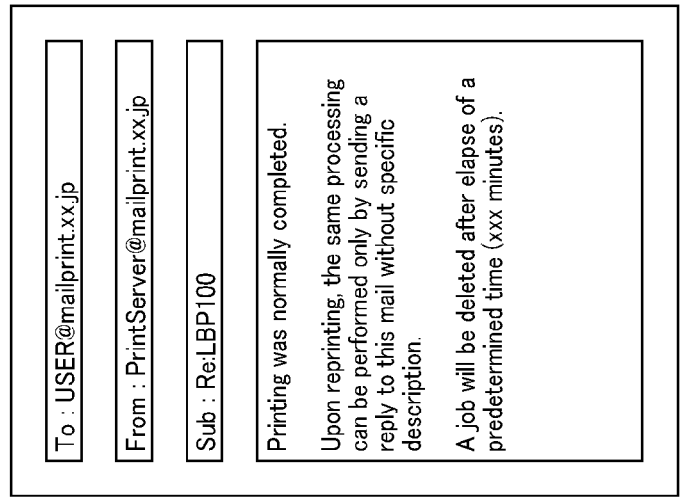

FIG. 12D shows an exemplary display screen on which an error notification mail sent as a reply in step S731 is displayed. Since it is determined in determination processing in step S715 that the attached file cannot be opened by an application installed on the print server 104, it is contemplated that a user may not know an extension with which the print server 104 is compatible. Thus, as shown in FIG. 12D, the reply unit 1047 sends as a reply an error notification mail including an indication of the fact that the print server 104 is incompatible with the file format of an attached file and thus is incapable of performing print processing and a list of file formats with which the print server 104 is compatible. More specifically, the list of file formats with which the print server 104 is compatible is a list of file extensions included in application information.

In step S717, the determination unit 1042 switches the default setting of a printer driver to a printer driver specified in step S707, that is, a printer driver corresponding to the print output destination printer designated in an email (step S717). The default setting of a printer driver is a printer driver corresponding to the print data transmission destination from among the printer drivers installed on the print server 104. A default printer is basically set on a PC (in this example, the print server 104) on which a printer driver is installed. Thus, it is preferable in terms of simple processing that the print server 104 changes a printer driver of default setting on ahead instead of changing a printer driver after opening a predetermined application. For this reason, the determination unit 1042 executes processing for switching default setting in step S717.

Next, the generation unit 1043 develops the attached file using an application specified as an application for use in development of the attached file in the determination processing in step S715. Then, the generation unit 1043 generates print data using a printer driver which a default printer driver has been switched in step S717, and the transmission unit 1044 transmits the generated print data to the print output destination printer (step S718).

Next, a determination unit 718 determines whether or not print processing of print data has been successfully performed in the print output destination printer (step S719). When print processing of print data has been failed in the print output destination printer, the process advances to step S720. When print processing of print data has been successfully performed in the print output destination printer, the process advances to step S722.

In step S720, the determination unit 718 sets a deletion flag to an email to be processed. Then, the reply unit 1047 sends an error notification mail as a reply to the mobile terminal device 101 which is the transmission source of the email to be processed (step S732).

Figure 12E:
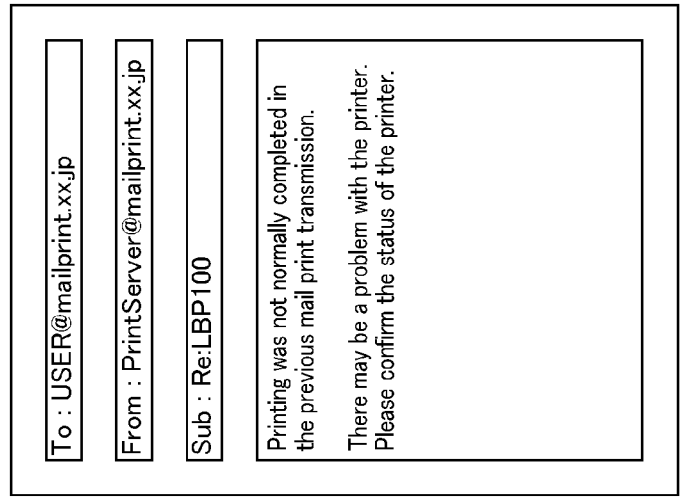

FIG. 12E shows an exemplary display screen on which an error notification mail sent as a reply in step S732 is displayed. Since it is determined in the determination processing in step S719 that print processing of print data has been failed in the print output destination printer, it is contemplated that the power OFF or paper jamming has occurred in the print output destination printer. Thus, the reply unit 1047 sends as a reply an error notification mail with the content describing the fact that printing cannot be performed due to a problem with the printer as shown in FIG. 12E.

Referring back to FIG. 11, the determination unit 1042 returns the setting back to its default setting (step S721), and the process advances to step S729.

In step S722, the determination unit 1042 returns the setting back to its default setting (step S722), and the process advances to step S723. Next, the determination unit 1042 determines whether or not a reply rejection attribute is set to an email to be processed (step S723). When a reply rejection attribute is set to an email to be processed, the reply unit 1047 does not transmit a reply mail. Then, the process advances to step S724. Next, the determination unit 1042 sets a deletion flag to an email to be processed (step S724), and the process advances to step S729.

When the determination unit 1042 determines in the determination processing in step S723 that a reply rejection attribute is not set to an email to be processed, the process advances to step S725. Then, in the following steps S725 to S727, the advance preparation processing for realizing reprinting is executed.

Firstly, the reply unit 1047 transmits a reply mail (a print completion notification mail) to the mobile terminal device 101 which is the transmission source of an email to be processed (step S725). The reply unit 1047 adds a header "In-Reply-To" to a reply mail and transmits the reply mail to the mobile terminal device 101. The reply unit 1047 sets identification information about the reply mail to the header "In-Reply-To". A user of the mobile terminal device 101 which has received the reply mail sends a reply to the reply mail to thereby be able to provide a reprint instruction for reprinting an attached file to an email. When the mobile terminal device 101 sends an email as a reply to a reply mail in accordance with the user operation, identification information about the reply mail transmitted from the print server 104 to the mobile terminal device 101 in step S725 is automatically input to the email.

Subsequent to the process in step S725, the reply unit 1047 executes the following processing. The reply unit 1047 stores correspondence information between identification information about a print completion notification mail and identification information about an email to be processed (an email corresponding to print data transmitted in step S718) as an identification information management list in the mail storage unit 1048 (step S726).

Next, the determination unit 1042 updates the storage time at which the processing target mail, which has already been processed, is stored in the mail storage unit 1048 (step S727), and the process advances to step S729. The reason why the storage time is updated in step S727 is to extend the time until an email is deleted from the mail storage unit 1048 in the processing to be described below with reference to FIG. 13. The storage time to be updated may be changed as appropriate by implementing a reprint constraint condition and is not necessarily limited to a specific storage time.

When it is determined in step S707 shown in FIG. 10 that the driver information does not include a printer driver corresponding to the print output destination printer, the following processing may also be executed in another embodiment instead of transmission of an error notification mail (step S730). In other words, when it is determined that the driver information does not include a printer driver corresponding to the print output destination printer, the print server 104 may also cause a default printer to perform printout.

Figure 13:
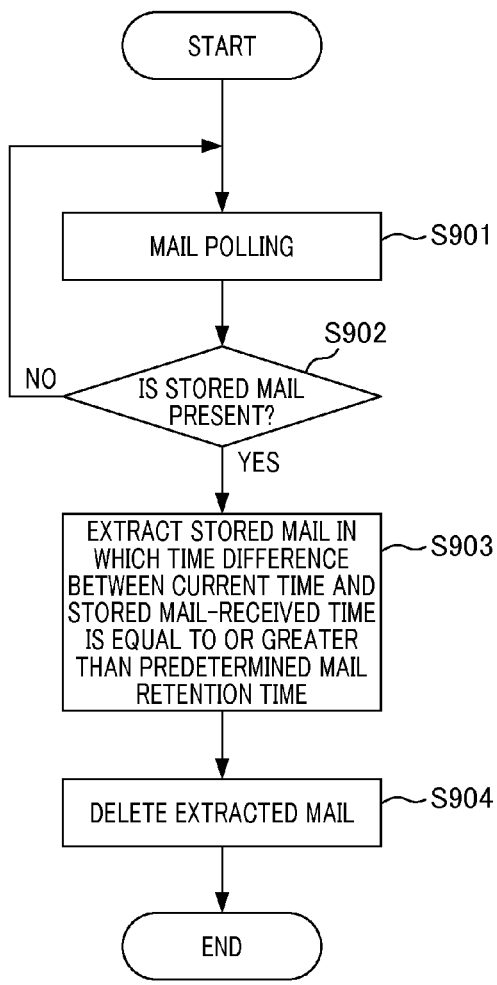
FIG. 13 is a flowchart illustrating an example of timed deletion processing for deleting emails.
Figure 14:
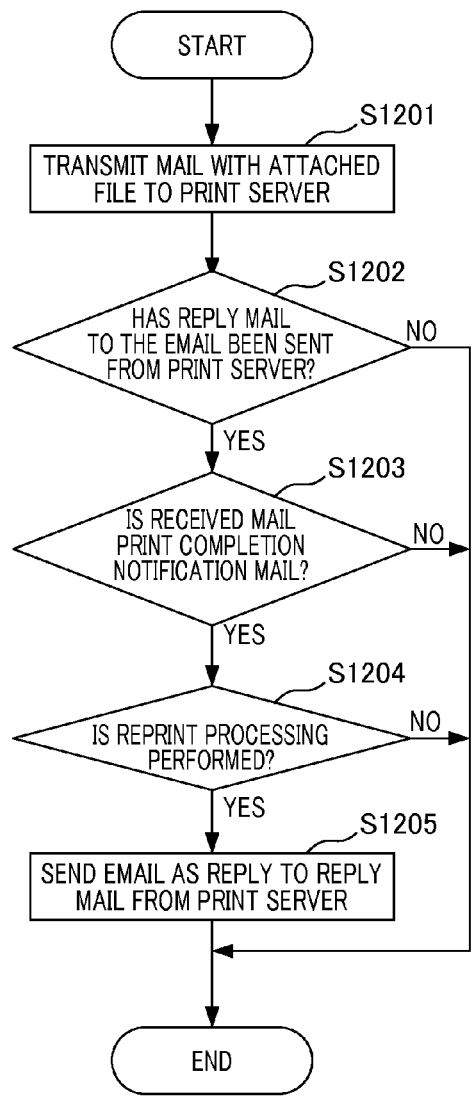
FIG. 14 is a flowchart illustrating operation processing performed by a mobile terminal device.

The processes in steps S709 to S713 shown in FIG. 10 are affected by the operation processing shown in FIGS. 13 and 14. Thus, a description will be given of the operation processing shown in FIGS. 13 and 14 prior to description of the processes in steps S709 to S713 shown in FIG. 10.

FIG. 13 is a flowchart illustrating an example of timed deletion processing for deleting emails. The timed deletion processing for deleting emails is executed by the deletion unit 1049 provided in the print server 104. In practice, the timed deletion processing for deleting emails is realized by the CPU 301 by developing a program stored in the ROM 302 or the HD 310 to the RAM 303 and executing the program. Although the timed deletion processing for deleting emails is executed independently of the operation processing shown in FIGS. 10 and 11, the result of processing is reflected to the operation processing shown in FIGS. 10 and 11.

Firstly, the deletion unit 1049 starts polling for confirming whether or not there is an email stored in the mail storage unit 1048 (step S901). A polling period may be arbitrarily set according to the use environment of the user.

Next, the deletion unit 1049 determines whether or not there is an email stored in the mail storage unit 1048 (step S902). When there is no email stored in the mail storage unit 1048, the process in step S901 is executed again after elapse of a predetermined polling period.

When there is an email stored in the mail storage unit 1048, the process advances to step S903. Then, the deletion unit 1049 compares a time difference between a current time and a stored mail-received time. The stored mail-received time is a time when a stored mail, i.e., an email stored in the mail storage unit 1048 has been received. The deletion unit 1049 extracts a stored mail in which the time difference between the current time and the stored mail-received time is equal to or greater than a predetermined mail retention time (step S903). The mail retention time may be arbitrarily set according to the use environment of the user. Then, the deletion unit 1049 deletes the extracted stored mail from the mail storage unit 1048 (step S904). According to the timed deletion processing for deleting emails described with reference to FIG. 13, an email stored in the print server 104 can be prevented from being remained therein and thus security is ensured.

FIG. 14 is a flowchart illustrating operation processing performed by a mobile terminal device. Firstly, the mobile terminal device 101 transmits an email with an attached file to the print server 104 using E-mail software (step S1201).

Next, the mobile terminal device 101 determines whether or not a reply mail to the email transmitted in step S1201 has been sent from the print server 104 (step S1202). When a reply rejection attribute is set to the email transmitted in step S1201, no reply mail is sent from the print server 104. Thus, the process ends in this case.

Figure 12F:
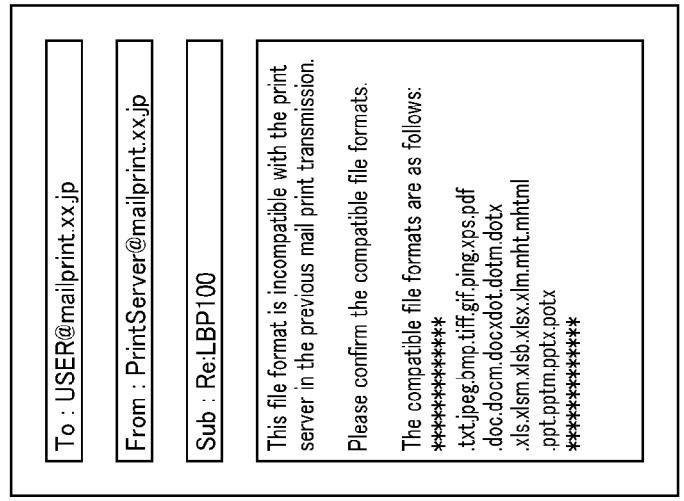

When a reply mail has been sent from the print server 104, the process advances to step S1203. Here, a reply mail from the print server 104 is either an error notification mail or a print completion notification mail as shown in FIG. 12F. Thus, in step S1203, the mobile terminal device 101 determines whether or not a reply mail from the print server 104 is a print completion notification mail (step S1203). When the reply mail from the print server 104 is a print completion notification mail, the process advances to step S1204. When the reply mail from the print server 104 is not a print completion notification mail but an error notification mail, the process ends.

Next, the mobile terminal device 101 determines whether or not reprint processing is executed in accordance with the user operation (step S1204). More specifically, when a user performs a reply operation for sending a reply to the reply mail received from the print server 104, the mobile terminal device 101 determines that reprint processing is executed. When the mobile terminal device 101 determines that reprint processing is not executed, the process ends. When the mobile terminal device 101 determines that reprint processing is executed, the process advances to step S1205. Then, the mobile terminal device 101 sends an email as a reply to the reply mail from the print server 104 (step S1205), and the process ends.

The email sent as a reply in step S1205 includes identification information about a reply mail from the print server 104. The print server 104 reprints an attached file to the stored email based on identification information about a reply mail included in the email. In other words, the reply of an email in step S1205 functions as a reprint instruction given from a user to the print server 104. A user can perform reprinting only by sending a reply to the reply mail from the print server 104.

Next, a description will be given of the processing subsequent to step S709 shown in FIG. 10. The determination unit 1042 sets a deletion flag to the email stored in step S704 (step S709). Next, the determination unit 1042 determines whether or not the email stored in step S704 includes identification information about a print completion notification mail (step S710). When the email stored in step S704 does not include identification information about a print completion notification mail, the determination unit 1042 determines that the mobile terminal device 101 does not provide a reprint instruction. Then, the process advances to step S733. Next, the reply unit 1047 sends an error notification mail as a reply to the mobile terminal device 101 which is the transmission source of an email to be processed (step S733), and the process advances to step S729.

FIG. 12B shows an exemplary display screen on which an error notification mail sent as a reply in step S733 is displayed. Since it is determined in the determination processing in step S705 that there is no file attached to the email, it is contemplated that a user has forgotten to attach a file to the email upon transmission of the email. Thus, the reply unit 1047 sends as a reply an error notification mail as shown in FIG. 12B for prompting retransmission of an email by attaching a file to be printed thereto.

Referring back to FIG. 10, when the email stored in step S704 includes identification information about a print completion notification mail, the determination unit 1042 determines that the mobile terminal device 101 provides a reprint instruction. Then, the process advances to step S711.

Next, the determination unit 1042 determines whether or not the stored mail specified in step S711 is stored in the mail storage unit 1048 (step S712). When the stored mail specified in step S711 is not stored in the mail storage unit 1048, the process advances to step S734. Then, the reply unit 1047 sends an error notification mail as a reply to the mobile terminal device 101 which is the transmission source of an email to be processed (step S734), and the process advances to step S729. In the present embodiment, the error notification mail sent as a reply in step S734 is the first error notification, the error notification mail sent as a reply in step S730 is the second error notification, and the error notification mail sent as a reply in step S731 shown in FIG. 11 is the third error notification.

FIG. 12C shows an exemplary display screen on which an error notification mail sent as a reply in step S733 is displayed. It is determined in step S712 that the stored mail specified in step S711 is not stored in the mail storage unit 1048. Thus, it is contemplated that, although a user has provided a reprint instruction, the stored mail has already been deleted from the mail storage unit 1048 by the timed deletion processing for deleting emails described with reference to FIG. 13. Thus, the reply unit 1047 sends as a reply an error notification mail as shown in FIG. 12C indicating the fact that a file to be printed that is desired by a user has already been deleted due to the elapse of a mail retention time and prompting retransmission of an email attached with the file.

When the stored mail specified in step S711 is stored in the mail storage unit 1048, the process advances to step S713. Then, the determination unit 1042 set the specified stored mail as the processing target (step S713), and the process advances to step S714.

As described above, according to the print system of the present embodiment, a user device can provide a reprint instruction for an attached file by sending a reply to the reply mail from the print server 104 which has executed print processing for the attached file. Thus, a user can execute reprinting by the simple operation such as transmission of reply mail without retransmitting an email to which an attached file is attached again.

When a printing condition is designated by a user upon sending a reply email for reprinting, the print server 104 may also change reprint processing in accordance with the printing condition. In other words, the mobile terminal device 101 may also designate a printing condition in an email to be sent as a reply to the reply mail from the print server 104.

The mail server 103 and the print server 104 in the present embodiment may be provided by separate information processing devices (PCs or the like) as described above or may also be provided by a single information processing device having both functions serving as a mail server and a print server. Also, the mobile terminal device 101 is an exemplary information processing device (PC or the like) which is capable of transmitting an email. Any information processing device having at least a function of transmitting an email can be employed as the mobile terminal device 101. Furthermore, although the devices are connected to each other via the LAN 106 in the example shown in FIG. 1, the present invention is also applicable to a system in which a mail server and a print server are present on Internet.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-125116 filed on May 31, 2012, which is hereby incorporated by reference herein in its entirety.

What is claimed is:

1. A print system comprising:
an image forming device; and
a print server that causes the image forming device to print-output a file attached to an email transmitted from a user device,
wherein the print server comprises:
a reception unit configured to receive an email, which has been transmitted from the user device and in which an image forming device is designated as a print output destination for the file attached to the email, and store the received email in a first storage unit;
a generation unit configured to generate print data corresponding to the file attached to the received email;
a transmission unit configured to transmit the generated print data to the image forming device as the print output destination;
a determination unit configured to determine whether or not information indicating rejection of reprinting of the attached file is included in the email when print data corresponding to the file attached to the email has been successfully printed in the image forming device;
a reply unit configured to transmit a reply mail indicating print completion to the user device when the determination unit determines that information indicating rejection of reprinting of the attached file is not included in the email, and not to transmit the reply mail when the determination unit determines that information indicating rejection of reprinting of the attached file is included in the email; and
a management unit configured to manage the email stored in the first storage unit and identification information about the reply mail in association with each other,
wherein, upon reception of an email including the identification information about the reply mail transmitted from the user device, the generation unit acquires an email managed in association with the identification information about the reply mail included in the received email from the first storage unit to thereby generate print data corresponding to the file attached to the acquired email.

2. The print system according to claim 1, wherein the print server further comprises:
a deletion unit configured to delete an email after a predetermined time has elapsed after storage of the email from among emails stored in the first storage unit; and
a notification unit configured to provide a first error notification for prompting transmission of an email with an attached file to the user device when the email corresponding to the identification information about the reply mail included in the email transmitted from the user device has already been deleted from the first storage unit.

3. The print system according to claim 1, wherein the user device further comprises:
a designation unit configured to designate an image forming device as the print output destination for the attached file by setting identification information about an image forming device as the print output destination for the file attached to the email to a subject field or a text field of the email to be transmitted.

4. The print system according to claim 1, wherein the print server further comprises:
a second storage unit configured to store correspondence information between a file extension and an application for opening a file corresponding to the file extension in advance; and
a third storage unit configured to store correspondence information between an image forming device and a printer driver as driver information in advance,
wherein the generation unit opens an attached file by activating an application corresponding to the file extension of the file attached to the email from among applications included in correspondence information stored in the second storage unit, and then generates the print data corresponding to the opened attached file using a printer driver corresponding to an image forming device designated as the print output destination from among printer drivers included in the driver information stored in the third storage unit.

5. The print system according to claim 4, wherein, when the driver information stored in the third storage unit does not include a printer driver corresponding to the image forming device designated as the print output destination, the notification unit executes a second error notification including a list of printer drivers included in the driver information.

6. The print system according to claim 4, wherein, when the correspondence information stored in the second storage unit does not include an application corresponding to the file extension of the file attached to the email, the notification unit executes a third error notification including a list of file extensions included in the correspondence information stored in the second storage unit.

7. A print server that causes an image forming device to print-output a file attached to an email transmitted from a user device, the print server comprising:
 a reception unit configured to receive an email, which has been transmitted from the user device and in which an image forming device is designated as a print output destination for the file attached to the email, and store the received email in a first storage unit;
 a generation unit configured to generate print data corresponding to the file attached to the received email;
 a transmission unit configured to transmit the generated print data to the image forming device as the print output destination;
 a determination unit configured to determine whether or not information indicating rejection of reprinting of the attached file is included in the email when print data corresponding to the file attached to the email has been successfully printed in the image forming device;
 a reply unit configured to transmit a reply mail indicating print completion to the user device when the determination unit determines that information indicating rejection of reprinting of the attached file is not included in the email, and not to transmit the reply mail when the determination unit determines that information indicating rejection of reprinting of the attached file is included in the email; and
 a management unit configured to manage the email stored in the first storage unit and identification information about the reply mail in association with each other,
 wherein, upon reception of an email including the identification information about the reply mail transmitted from the user device, the generation unit acquires an email managed in association with the identification information about the reply mail included in the received email from the first storage unit to thereby generate print data corresponding to the file attached to the acquired email.

8. The print server according to claim 7, further comprising:
 a deletion unit configured to delete an email after a predetermined time has elapsed after storage of the email from among emails stored in the first storage unit; and
 a notification unit configured to provide a first error notification for prompting transmission of an email with an attached file to the user device when the email corresponding to the identification information about the reply mail included in the email transmitted from the user device has already been deleted from the first storage unit.

9. The print server according to claim 7 further comprising:
 a second storage unit configured to store correspondence information between a file extension and an application for opening a file corresponding to the file extension in advance; and
 a third storage unit configured to store correspondence information between an image forming device and a printer driver as driver information in advance,
 wherein the generation unit opens an attached file by activating an application corresponding to the file extension of the file attached to the email from among applications included in correspondence information stored in the second storage unit, and then generates the print data corresponding to the opened attached file using a printer driver corresponding to an image forming device designated as the print output destination from among printer drivers included in the driver information stored in the third storage unit.

10. The print server according to claim 9, wherein, when the driver information stored in the third storage unit does not include a printer driver corresponding to the image forming device designated as the print output destination, the notification unit executes a second error notification including a list of printer drivers included in the driver information.

11. The print server according to claim 10, wherein, when the correspondence information stored in the second storage unit does not include an application corresponding to the file extension of the file attached to the email, the notification unit executes a third error notification including a list of file extensions included in the correspondence information stored in the second storage unit.

12. A method for controlling a print server that causes an image forming device to print-output a file attached to an email transmitted from a user device, the method executed in the print server comprising:
 receiving an email, which has been transmitted from the user device and in which an image forming device is designated as a print output destination for the file attached to the email, and storing the received email in a first storage unit;
 generating print data corresponding to the file attached to the received email;
 transmitting the generated print data to the image forming device as the print output destination;
 determining whether or not information indicating rejection of reprinting of the attached file is included in the email when print data corresponding to the file attached to the email has been successfully printed in the image forming device;
 transmitting a reply mail indicating print completion to the user device when it is determined, in the determining, that information indicating rejection of reprinting of the attached file is not included in the email, and not transmitting the reply mail when it is determined, in the determining, that information indicating rejection of reprinting of the attached file is included in the email; and
 managing the email stored in the first storage unit and identification information about the reply mail in association with each other,
 wherein, in the generating, upon reception of an email including the identification information about the reply mail transmitted from the user device, an email managed in association with the identification information about the reply mail included in the received email is acquired from the first storage unit and then print data corresponding to the file attached to the acquired email is generated.

13. A non-transitory computer readable storage medium on which is stored a computer program for making a computer execute a method for controlling a print server that causes an image forming device to print-output a file attached to an email transmitted from a user device, the method executed by the print server comprising:

receiving an email, which has been transmitted from the user device and in which an image forming device is designated as a print output destination for the file attached to the email, and storing the received email in a first storage unit;

generating print data corresponding to the file attached to the received email;

transmitting the generated print data to the image forming device as the print output destination;

determining whether or not information indicating rejection of reprinting of the attached file is included in the email when print data corresponding to the file attached to the email has been successfully printed in the image forming device;

transmitting a reply mail indicating print completion to the user device when it is determined, in the determining, that information indicating rejection of reprinting of the attached file is not included in the email, and not transmitting the reply mail when it is determined, in the determining, that information indicating rejection of reprinting of the attached file is included in the email; and managing the email stored in the first storage unit and identification information about the reply mail in association with each other, wherein, in the generating, upon reception of an email including the identification information about the reply mail transmitted from the user device, an email managed in association with the identification information about the reply mail included in the received email is acquired from the first storage unit and then print data corresponding to the file attached to the acquired email is generated.

* * * * *